(12) United States Patent
Shafik et al.

(10) Patent No.: US 12,400,305 B2
(45) Date of Patent: Aug. 26, 2025

(54) DETECTING REPRESENTATIVE BIAS WITHIN IMAGE DATA SETS

(71) Applicant: EMC IP Holding Company LLC, Hopkinton, MA (US)

(72) Inventors: Farida Shafik, Cairo (EG); Shary Beshara, Cairo (EG); Amy N. Seibel, Newton, MA (US); Eric Bruno, Shirley, NY (US); Megan Hyland, Belmont, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 407 days.

(21) Appl. No.: 17/451,898

(22) Filed: Oct. 22, 2021

(65) Prior Publication Data

US 2023/0127865 A1 Apr. 27, 2023

(51) Int. Cl.
*G06N 20/00* (2019.01)
*G06T 7/00* (2017.01)

(52) U.S. Cl.
CPC ........... *G06T 7/0002* (2013.01); *G06N 20/00* (2019.01); *G06T 2207/20081* (2013.01)

(58) Field of Classification Search
CPC ........ G06T 7/0002; G06T 2207/20081; G06N 20/00
USPC .......................................................... 382/159
See application file for complete search history.

(56) References Cited

U.S. PATENT DOCUMENTS

| | | | |
|---|---|---|---|
| 2019/0287121 A1* | 9/2019 | Waksman | G06N 20/20 |
| 2019/0362396 A1* | 11/2019 | Srivastava | G06Q 30/0282 |
| 2020/0081865 A1* | 3/2020 | Farrar | G06N 20/00 |
| 2020/0105400 A1* | 4/2020 | Alvelda, VII | G06V 10/26 |
| 2020/0151251 A1* | 5/2020 | Barachha | G06F 40/289 |
| 2020/0380398 A1* | 12/2020 | Weider | G06F 16/285 |

OTHER PUBLICATIONS

Camilleri et al., "Bias in Machine Learning: How Facial Recognition Models Show Signs of Racism, Sexism and Ageism", Towards Data Science, Dec. 13, 2019, https://towardsdatascience.com/bias-in-machine-learning-how-facial-recognition-models-show-signs-of-racism-sexism-and-ageism-32549e2c972d.

* cited by examiner

*Primary Examiner* — Stephen P Coleman
(74) *Attorney, Agent, or Firm* — Workman Nydegger (57) ABSTRACT

One example method includes determining representation bias in a data set. A bias detection engine is trained using a data set that is sufficiently diversified and/or unbiased. Once trained, test data sets can be evaluated by the bias detection engine to determine an amount of representation bias in the test data sets. The representation bias can be visually conveyed to a user and suggestions on how to reduce the representation bias may be provided and/or implemented to reduce the representation bias in the test data set. Suggestions can be implemented by adding or removing data from the test data that will reduce the representation bias.

18 Claims, 8 Drawing Sheets

DETECTING REPRESENTATIVE BIAS WITHIN IMAGE DATA SETS

FIELD OF THE INVENTION

Embodiments of the present invention generally relate to data set evaluation and bias detection operations. More particularly, at least some embodiments of the invention relate to systems, hardware, software, computer-readable media, and methods for detecting and remedying representative bias in data sets including image data sets.

BACKGROUND

Data sets, including image data sets, are often used to train machine learning models. These machine learning models are then used in various applications such as law enforcement, medicine, education, and hiring. However, the data sets used to train the machine learning models often include unfairness. In other words, the unfairness of a data set can have a negative impact on artificial intelligence and machine learning models. The unfairness in the data set can lead, more specifically, to negative consequences for underrepresented parties. This can be critical, for example, in law enforcement and health care applications.

In the context of machine learning, biased input leads to biased output. In other words, if there is a pattern or other kind of unfairness in the data set, the model will reflect this unfairness in future inferences or suggestions.

Representation bias occurs when the training data does not correctly represent the true population or when the training data under-samples specific groups. The inability to adequately generalize leads to biased decisions. This can lead to serious and offensive errors.

More specifically, many facial data sets (e.g., used for face recognition) are skewed towards a specific gender, age, or appearance. In fact, almost 70% of the people pictured in the IMDB-Face data set are in the 13-30 age group and 88% are of lighter skin tone. The Looking for Faces in the Wild (LFW) contains images that are 77.4% male and 81.2% have a lighter skin tone. Thus, there is a need to remove bias from data sets.

Another problem with image data sets is that data scientists and machine learning model users may be unaware of the bias within the data set prior to use. This may result in training machine learning models with unfair data sets. These machine learning models do not deploy or generalize effectively. In fact, retraining a model on a balanced data set can improve the mean average error substantially. Systems and methods are needed to detect bias in data sets including image data sets.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to bias detection. More particularly, at least some embodiments of the invention relate to systems, hardware, software, computer-readable media, and methods for detecting the presence and magnitude of bias within data sets. While embodiments of the invention are discussed with reference to image data sets and more particularly to face recognition, embodiments of the invention may be implemented to detect bias in other types of data sets.

In general, example embodiments of the invention relate to mitigating the unfairness included in data sets. This is achieved, for example, by training a machine learning model, such as a bias detection engine, with a data set that is as unbiased as possible. The data set used for training, for example, should cover all groups of the population being represented and all of the groups should be of equal sizes in one example. Once the bias detection engine is trained with a data set or with data sets that are preferably unbiased (unbiased as possible), the bias detection engine can be configured to evaluate or test other data sets for bias.

Figure 1:
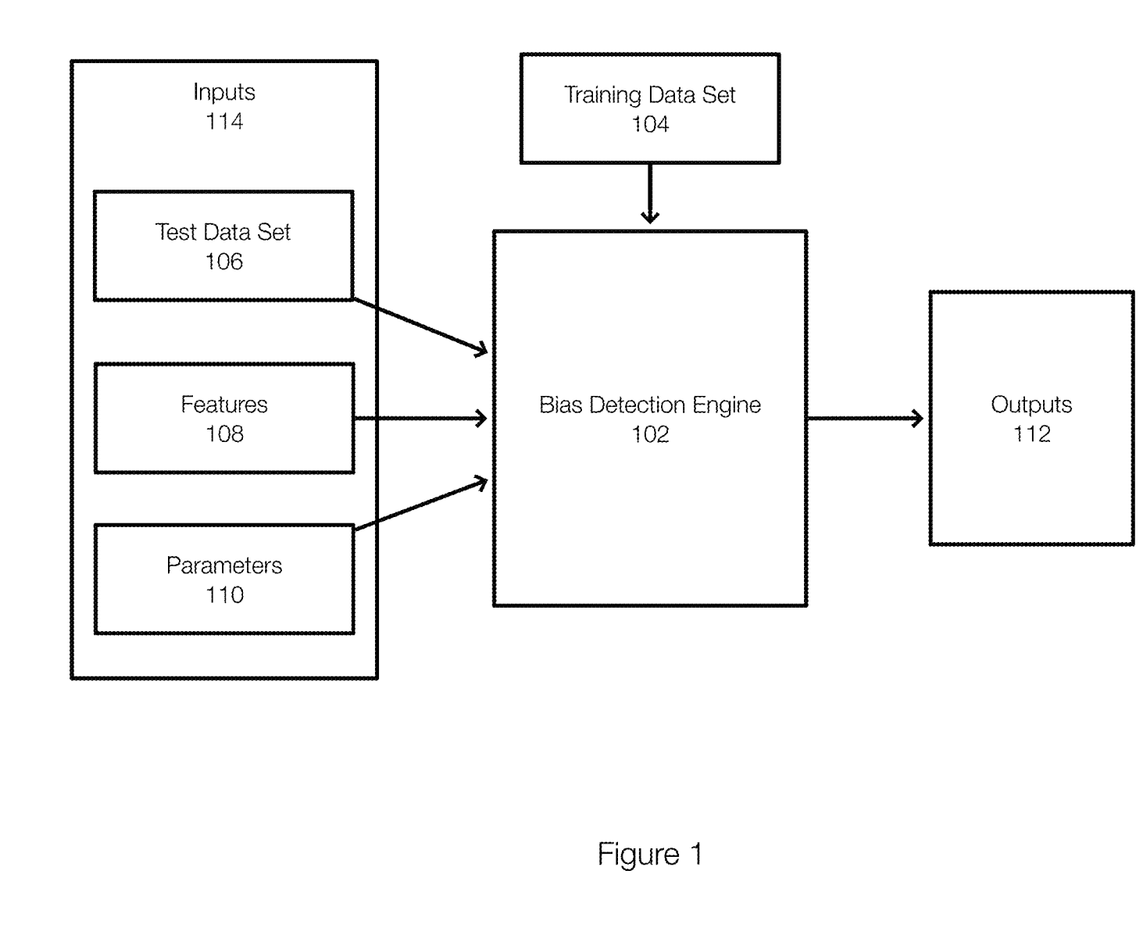
FIG. 1 discloses aspects a bias detection engine configured to detect bias in data sets.

FIG. 1 discloses aspects of a bias detection engine. The bias detection engine 102 may be implemented in a local execution environment, an edge execution environment, and/or a cloud execution environment. The bias detection engine 102 may use or include computing resources such as processors, memory, and the like.

The bias detection engine 102 in FIG. 1 typically receives inputs 114 and generates outputs 112, such as insights. The inputs 114 include, by way of example only, a test data set 106, features 108, and/or parameters 110. Before receiving the inputs 114, the bias detection engine 102 may be trained with the training data set 104. After the bias detection engine 102 is trained with e training data set 104, the bias detection engine 102 can evaluate the test data set 106 for bias.

The test data set 106 may start with more bias or with more of an uneven distribution than the training data set 104. The bias detection engine 102 may evaluate the test data set 106 using features 108. For example, when the test data set 106 is for facial recognition, the features 108 may include prominent facial features. In non-image data sets, features such as demographic data, or other key feature specific to an area of interest may be used.

If known and if available, parameters 110 for each of the selected features 108 may also be provided. The parameters 110 may include, for example, ranges of acceptable values for the relevant features 108.

The outputs 112 may depend on the configuration of the bias detection engine 102. However, examples of outputs 112 include insights such as a bias diversity score, distribution per feature/parameter, comparison of distribution to base or training data set, comparison to user's average dataset, comparison to other datasets with the same features, and/or improvement over time.

The outputs 112 may also include explanations of the diversity score, visualizations of the diversity scores (e.g., pie charts, ratings, odometers, textual explanations), explanations of the implications, and/or suggestions for improvements to the data set.

Figure 2:
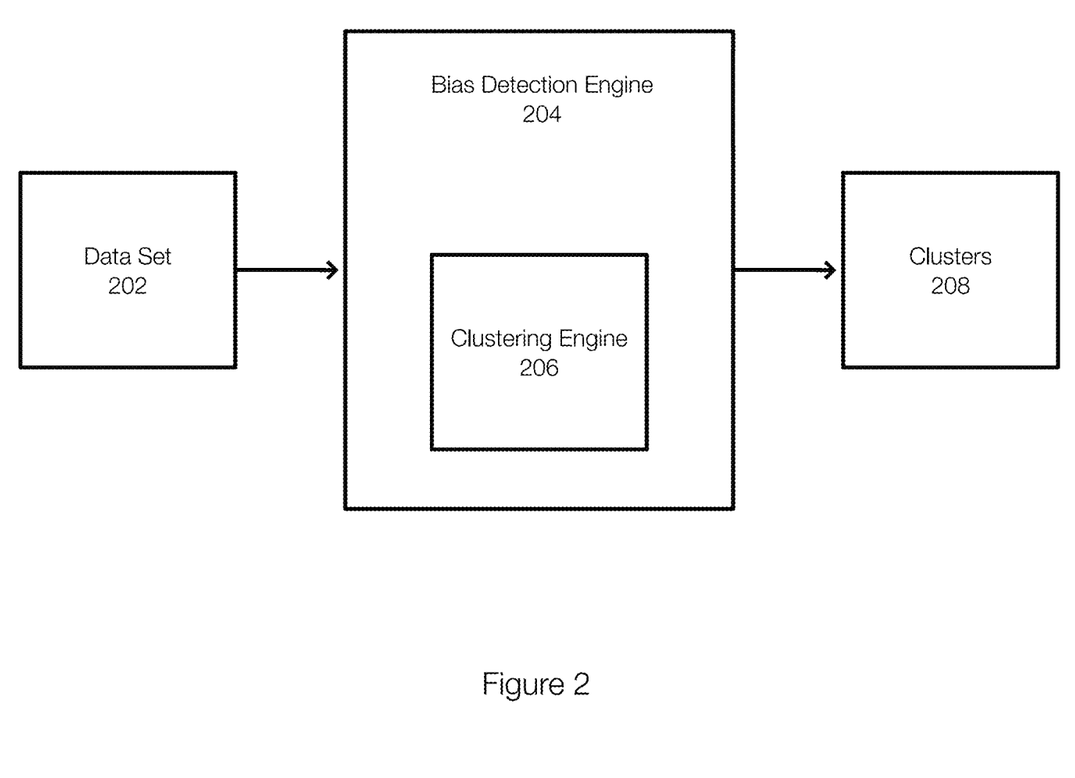
FIG. 2 discloses aspects of clustering performed by a bias detection engine.

FIG. 2 discloses aspects of the bias detection engine. In FIG. 2, the bias detection engine 204 includes a clustering engine 206. The clustering engine 206 may receive the data set 202 and generate clusters 208. The clustering engine 206 may use various clustering models such as, by way of example only, k means clustering, mean-shift clustering, expectation-maximization (EM) clustering using gaussian mixture models (GMM), or the like or combination thereof.

The clustering engine 206 (or the bias detection engine 204) is configured to generate clusters (groups of entries such as images or records) that share similar values. When the bias detection engine 204 is trained with an unbiased or substantially unbiased data set that represents groups of a population, where each group is of the same size, the resulting clusters should be of equal or of substantially equal sizes. Alternatively, the cluster engine 206 may also be configured to account for situations where the population does not include groups of the same size. The cluster engine 206 may be configured such that one of the groups is not over-sampled.

In one example, a threshold value may be set to determine what the maximum acceptable difference is between clusters. The threshold value may be expressed in terms of absolute value or in terms of percentage. For example, instead of requiring clusters to have the same size, the threshold may allow the clusters to have different sizes within a percentage. If there are 5 groups, the clusters (if equal sizes) may each represent 20%. With a threshold of 3%, the clusters could range from 17% to 23% in one example or all of the clusters would need to be within 3% of each other (e.g., each cluster would be between 18% and 21% or between 19% and 22%). Further, a threshold may also be used to define the highest and lowest number of datapoints within a cluster. In one example, clusters are substantially similar when satisfying the relevant threshold values.

Consider an example data set covering different appearances. To determine if a data set is diverse, a set of features/attributes are defined. If the data set is being clustered for appearance or facial recognition, a facial landmark detector included in Python's dlib library may be used. The detector identifies 68 (x,y) coordinates on a face. The distances between different points are calculated and correlated to develop a set of ratios that define the face's appearance.

These ratios may include:
facial index: the ratio of the facial height to the facial width;
mandibular index: the ratio of the chin's length to the chin's width;
intercanthal index: the ratio of the internal distance between the eyes over the overall width of both eyes;
orbital width index (left and right): the ratio of each eye's width over the internal distance between the eyes;
eye fissure index (left and right): the ratio of the eye's height to the eye's width;
nasal index: the ratio of the nose's width over the nose's height; and
mouth-face width index: the ratio of the mouth's width over the facial width.

These ratios are examples of features that may be input to the bias detection engine. Once the features are determined, the parameters that define the expected range of values for the different features in order to claim diversity (or lack thereof) are determined. For example, the minimum and maximum values of the facial index could be set to the smallest and largest values expected from medical records or from available data such as scientific literature. More generally, the goal is to eliminate implausible values while still allowing for a diverse set of datapoints. For example, these values and ranges may be used to build a ground truth data set. The cluster engine can be trained with using a data set as a ground truth or a data set rated with considerable diversity that includes the expected ranges or that includes sufficiently diverse data points. Other features may be treated in a similar manner.

To ensure that the entire range is represented evenly, the data set is then clustered to create groups of images that have similar values of features, and therefore appearances. Because the data set is diverse, clustering creates groups of equal or of substantially equal sizes. Depending on the population and the expected sizes of groups in the population, the cluster sizes may be different and may not be of substantially equal sizes.

Figure 3A:
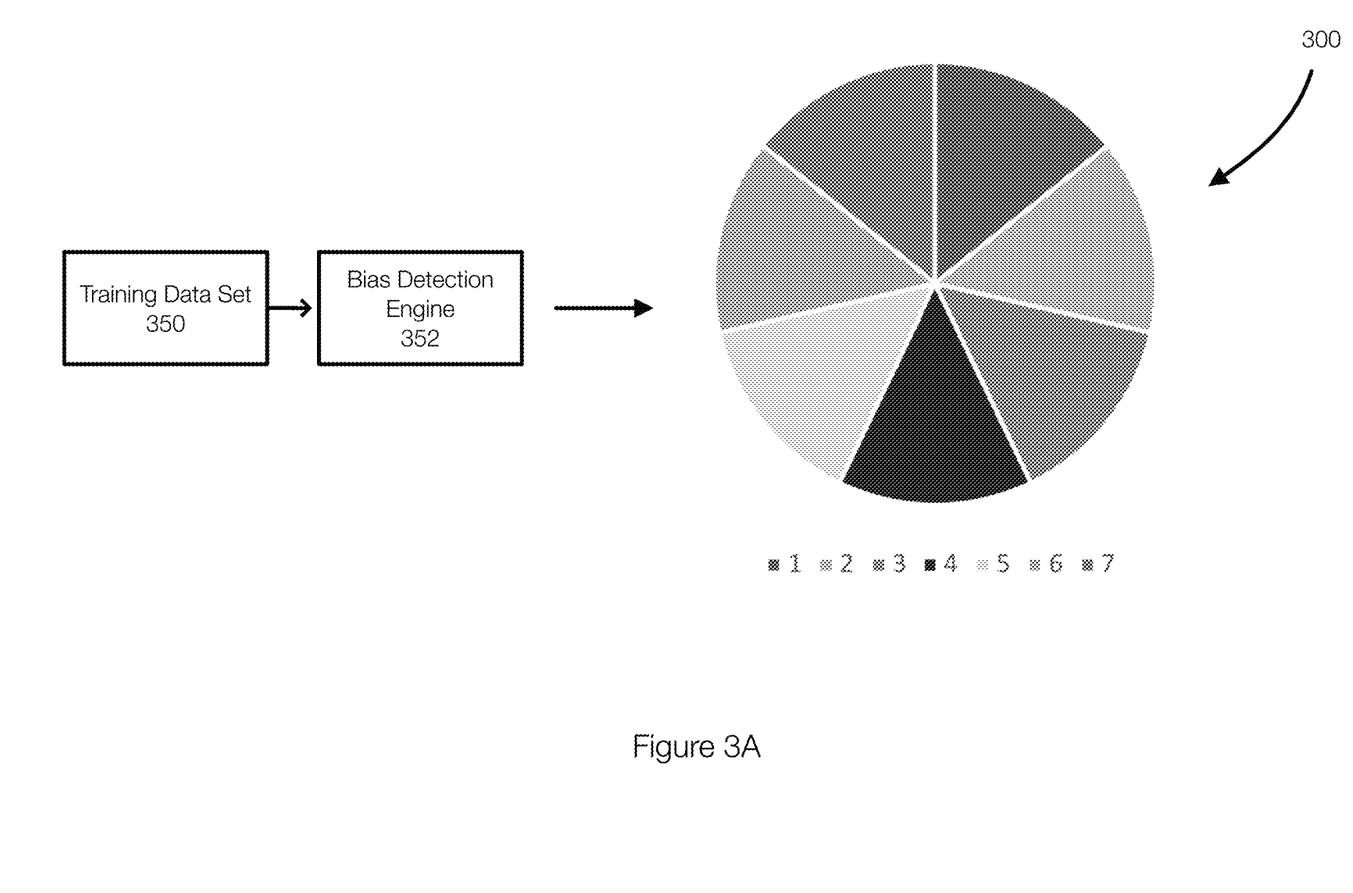
FIG. 3A discloses aspects of training or clustering a sufficiently unbiased or diversified data set.

FIG. 3A illustrates an example of clustering for a training data set. FIG. 3A illustrates a training data set 350 used to train a bias detection engine 352 (an example of the bias detection engine 102). The training data set 350 is selected to include diverse images or diverse data points. When this data set is clustered, the output includes clusters 300. In this example, because the training data set 350 is, for discussion purposes only, completely unbiased and is well diversified, each of the clusters 300 has the same size or substantially the same size. The sizes of the individual clusters is represented in a pie chart in FIG. 3A. Equal sized clusters (or substantially equal sized clusters) reflects the fact that the training data set 350 is sufficiently diversified or unbiased.

Once the bias detection engine is trained, the bias detection engine can be used to determine whether other data sets are biased or sufficiently diversified. If the bias detection engine generates clusters of unequal sizes, the data set is likely not sufficiently diverse. If the detection engine generates clusters of sufficiently equal sizes, the data set is likely sufficiently diverse.

Figure 3B:
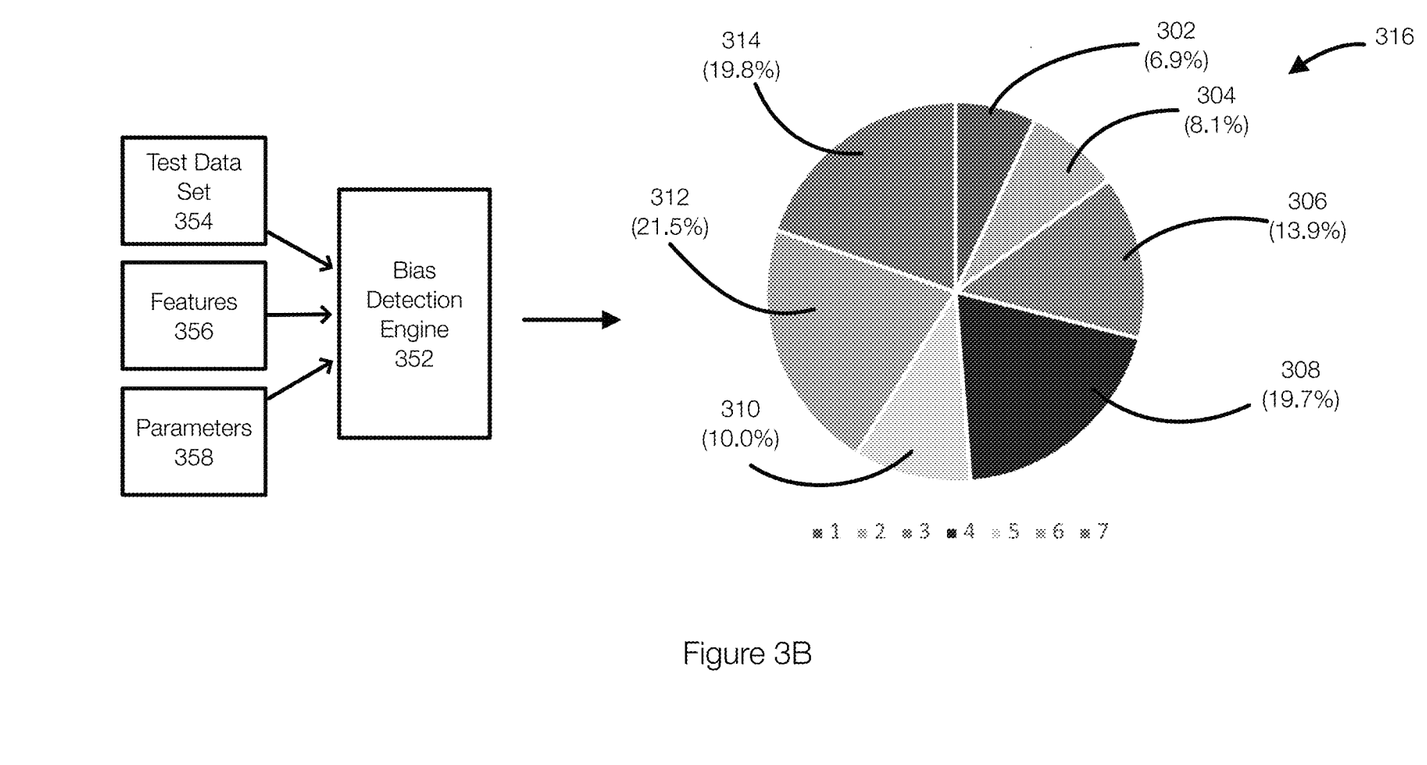
FIG. 3B discloses aspects of clustering a biased or insufficiently diversified data set with a trained clustering engine.

FIG. 3B illustrates an example of clustering a test data set. The test data set 354 is input to the bias detection engine 352 along with features 356 and parameters 358. The bias detection engine 352 processes the test data set 354 into clusters 316. In this example, the clustering performed by the bias detection engine 352 results in 7 groups of unequal sizes. The sizes of the individual clusters in the clusters 316 is represented in a pie chart in FIG. 3B. The clusters 302, 304, 306, 308, 310, 312, and 314 correspond, respectively, to 6.9%, 8.1%, 13.0%, 19.7%, 10.0%, 21.5%, and 19.8% of the data points (images) in the test data set 354. Thus, the cluster 302 includes 6.9% of the images in the test data set 354.

Because the clusters 316 have unequal sizes that are not within a threshold value, the test data set 354 is deemed not diverse or biased. To better quantify the representation bias within the test data set 354, a Shannon score may be applied. A Shannon score measures the amount of imbalance across different groups within a population. A score of 1 indicates that all groups are perfectly balanced. Thus, a Shannon score of 1 indicates that the data set is diverse or sufficiently unbiased. The clusters 316 have a Shannon score of 0.96.

Figure 3C:
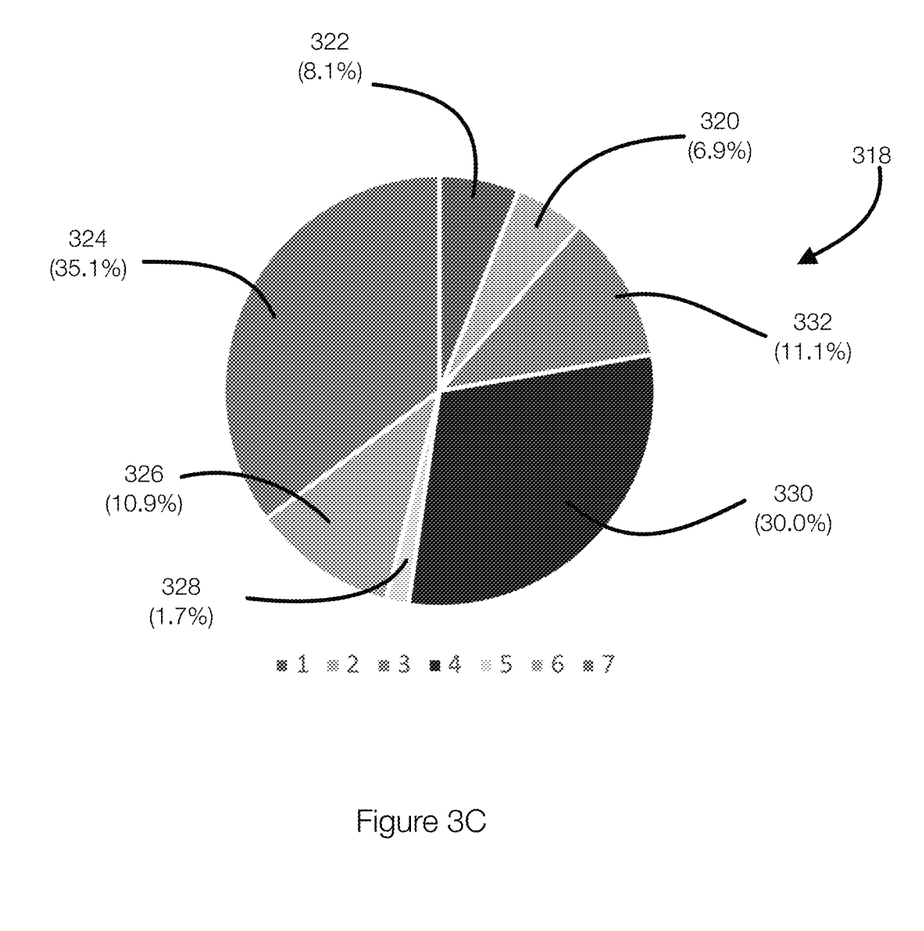
FIG. 3C discloses additional aspects of clustering a biased or insufficiently diversified data set with a trained clustering engine.

FIG. 3B illustrates another example of clustering a data set. The data set corresponding to the clusters 318 has a Shannon score of 0.82. The sizes of the individual clusters in the clusters 318 is represented in a pie chart in FIG. 3C. As illustrated in FIG. 3C, the clusters 320, 322, 324, 326, 328, 330, and 332 correspond, respectively, to 8.1%, 35.1%, 10.9%, 1.7%, 30.90%, 11.1%, and 6.9% of the images in the corresponding test data set. A comparison of the clusters 316 in FIG. 3B and the clusters 318 in FIG. 3C indicates that the clusters 318 have more bias. This is reflected in the lower Shannon score of 0.82.

The bias detection engine may output the representation bias visually, such as by pie charts. However, the bias may be presented in a user interface on a display using other forms (charts, text, and other graphics).

Figure 4:
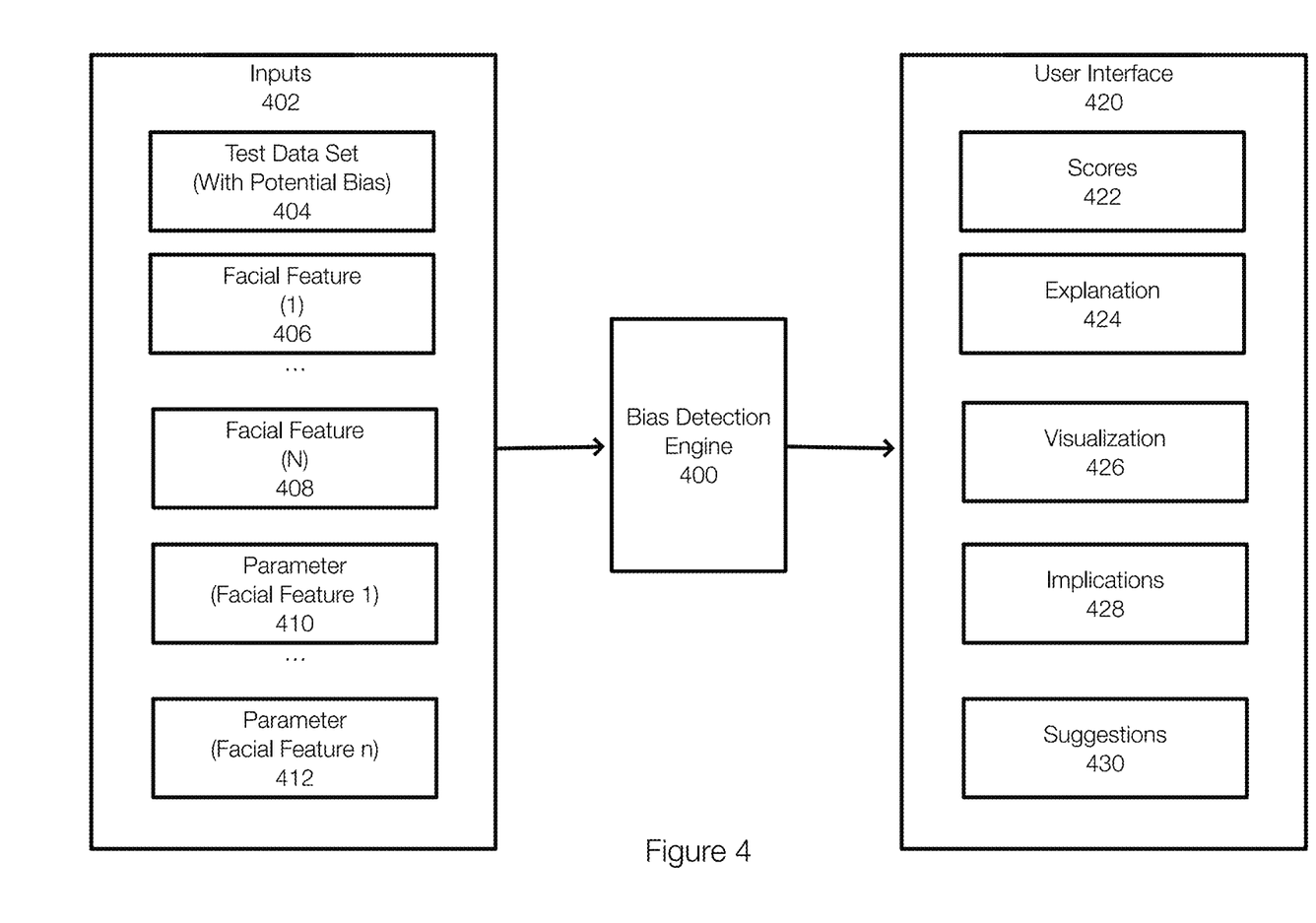
FIG. 4 discloses aspects of inputs to and outputs of a bias detection engine.

FIG. 4 discloses aspects of inputs to and outputs of a bias detection engine. FIG. 4 illustrates a bias detection engine 400, which is an example of the bias detection engine 102. The inputs 402 include a test data set 404, which may have a potential bias. The bias detection engine 400 is configured to detect the bias in the test data set 404, if present. This example focuses on a data set of images/faces, but other embodiments may use other data types.

The features include facial features 1-n, represented by facial features 406-408. The inputs 402 also include parameters 1-n, represented by parameters 410-412. Thus, each of the features is associated with a corresponding feature in this example.

The bias detection engine 400 receives these inputs and generates clusters. The user interface 420 is used to convey the outputs or insights of the bias detection engine 400. The user interface 420 thus displays scores 422. The scores 422 may include a diversity score (e.g., a Shannon score), a distribution per feature/parameter. Thus, multiple clusters—one for each feature/parameter may be generated. The scores 422 may include a comparison of the distribution or the clusters of the test data set 404 to a base data set or to an average data set. The scores 422 in the user interface 420 may also include a comparison to other data sets with these features and may illustrate improvements over time.

The outputs in the user interface 420 may include an explanation 424 of the diversity score. The explanation 424 may convey that, based on the diversity score, the data set is sufficiently diversified or insufficiently diversified.

The visualization 426 may convey the results in a visual form, such as a pie chart. This provide the user with a visual indication of whether the data is sufficiently diversified or sufficiently unbiased. As previously stated, a sufficiently diversified data set is within a threshold value (e.g., each group is within 5% of the other groups in terms or each group contains a number of images between high and low threshold values.

The implications 428 may convey that the data set may lead to negative consequences for underrepresented parties or that the data set may lead to unfair results in use. The suggestions 430 are provided to the user as a way to improve the test data set 404.

With reference to FIG. 3C and FIG. 4, the suggestions 430 may state that the cluster 328 does not have sufficient representation. Models trained on the corresponding data set will not clearly distinguish faces within the cluster 328.

In one example, the images in the cluster 328 have specific mean values. The suggestions 430 may state (by way of example only) add images to the data set with the following features:
facial index: 0.71,
mandibular index: 0.83, and
intercanthal index: 0.91.

Thus, a user may test the data set 404 and then, based on the outputs of the bias detection engine 400, make changes to the test data set 404. This may include adding images with certain features. With regard to FIG. 3C, the suggestions 430 may suggest down sampling (e.g., removing images from the cluster 324 and the cluster 330).

Figure 5:
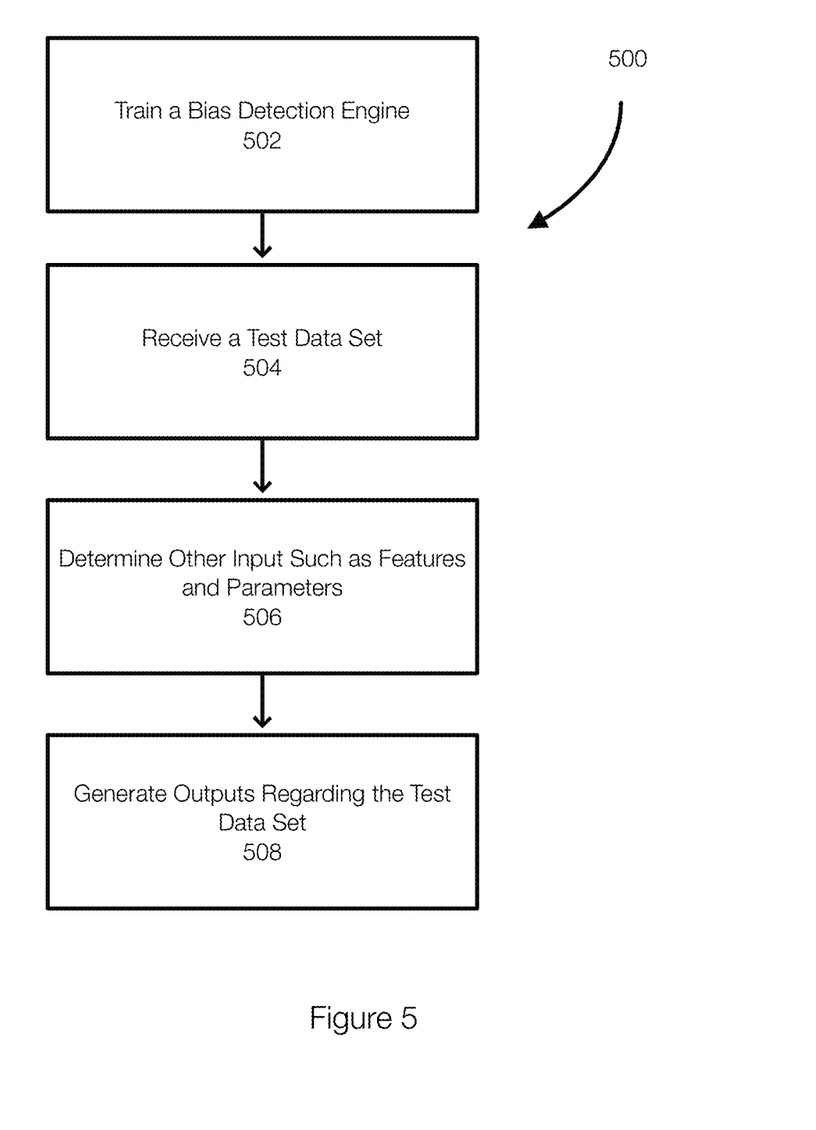
FIG. 5 discloses aspects of a method for determining representation bias in a data set.

FIG. 5 discloses aspects of a method for determining representation bias in data sets. Some elements of the method 500 may be performed less frequently or only as necessary. In the method 500 of FIG. 5, a bias detection engine is trained 502 using a diverse data set. Once the bias detection engine is trained, a test data set is received 504 as input to the bias detection engine. Other input, such as features and/or parameters, may also be determined 506 and input to the bias detection engine.

Next, outputs are generated 508 regarding the test data set. The outputs may be used to improve the test data set and the test data set can be tested again for representative bias.

Embodiments of the invention advantageously provide an automated approach to detect representation bias in data set. The amount of representation bias can be quantified and used to support comparisons and ratings across different data sets. Thus, when a user is selecting from amongst different data sets, the representation bias can be considered. A user can compare data sets with other data sets used by the user, other data sets in the user's organization, or other data sets in the same platform or network.

Embodiments of the invention further enhance the ability to understand the results by providing scores, in one example, both numerically, visually, and/or with text. This allows comparisons across different data sets to be easily determined and allows the amount of bias in a data set to be understood visually. The visualization shows where data is lacking and where data sets are heavily biased. The visualization of the output of the bias detection engine also allows a user to quickly discern how to mitigate the bias, if present.

The suggestions and explanations, which may include warnings, indicate how the diversity score can impact results and may allow the user to improve the diversity score. The suggestions and explanations allow the user to understand what the difference in bias would be with and without the suggested changes. The suggestions can be implemented by changing the test data set. This may include adding additional images or data points according to the results. Thus, if one group is not properly represented, more images or data points can be added relative to that group. Alternatively, images may also be removed in order to improve the results of testing a test data set. Further, specific features could be identified and images or data points with those features could be added to the test data set.

In another example, diversity scores can be used by customers when purchasing or leasing a specific data set, as the diversity scores ensures that the customer is aware of the possible bias.

The results may also add bias flags to data and metadata and datasets along with explanations of why they were added. This helps the user understand the potential bias and may allow improvements to be made.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, bias detection operations. These may include feature and parameter identification operations, clustering operations, machine learning model operations, generating visual representations of the output or the like or combination thereof.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, bias detection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, or containers, or any combination of these, though no particular device implementation or configuration is required for any embodiment.

As used herein, the term 'data' or 'data set' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, image files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving input to a bias detection engine, the input including a test data set, features related to the test data set, and parameters of the features, processing the input by the bias detection engine by clustering data points in the test data set into clusters, determining a diversity score for the data set based on the clusters, wherein the diversity score represents an amount of representation bias in the test data set.

Embodiment 2. The method of embodiment 1, further comprising training the bias detection engine with a training data set that is unbiased or substantially unbiased.

Embodiment 3. The method of embodiment 1 and/or 2, wherein the clusters are scored using a Shannon score, further comprising determining a threshold score.

Embodiment 4. The method of embodiment 1, 2, and/or 3, wherein the test data set is biased when the diversity score is below the threshold score and wherein the test data set is sufficiently unbiased when the diversity score is greater than the threshold score.

Embodiment 5. The method of embodiment 1, 2, 3, and/or 4, further comprising generating additional scores including at least one of: a distribution per feature/parameter, a comparison of distribution between the test data set and a base data set, a comparison of the test data set to an average data set, a comparison of the test data set to other data sets having the same features, or an improvement in the diversity score for the test data set over time.

Embodiment 6. The method of embodiment 1, 2, 3, 4, and/or 5, further comprising generating an explanation of the diversity score.

Embodiment 7. The method of embodiment 1, 2, 3, 4, 5, and/or 6, further comprising generating a visualization of the diversity score and/or the additional scores.

Embodiment 8. The method of embodiment 1, 2, 3, 4, 5, 6, and/or 7, further comprising generating an explanation of implications of the diversity score.

Embodiment 9. The method of embodiment 1, 2, 3, 4, 5, 6, 7, and/or 8, further comprising generating suggestions for improving the test data set.

Embodiment 10. The method of embodiment 1, 2, 3, 4, 5, 6, 7, 8, and/or 9, wherein the test data set includes images of faces and wherein the bias detection engine is trained with a training data set of images of faces.

Embodiment 11. The method of embodiment 1, 2, 3, 4, 5, 6, 7, 8, 9, and/or 10, wherein the training data set covers all groups of a population represented by the training data set, wherein all groups are of equal sizes or wherein the training data are configured such than any one group is of the population not over-represented.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
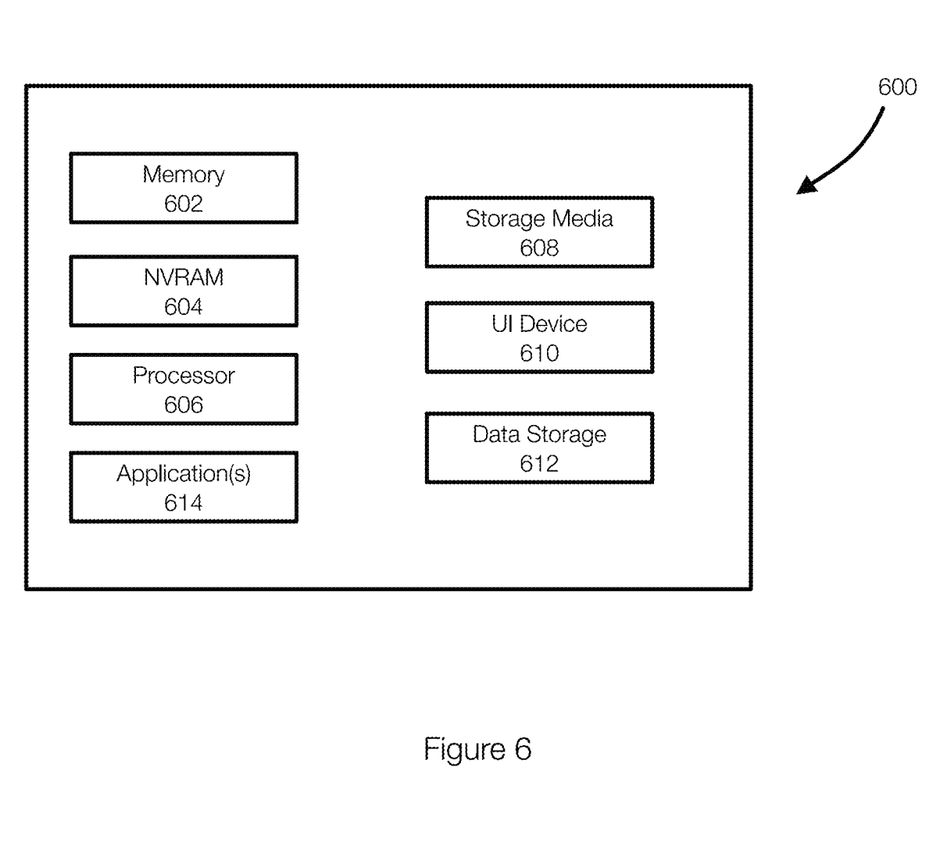
FIG. 6 discloses aspects of a computing device or a computing system.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 (or computing system) includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   training a bias detection engine with a training data set that is unbiased or substantially unbiased, wherein the training data set covers all groups of a population represented by the training data set, wherein all the groups are of equal sizes or wherein the training data set is configured such than any one group of the population is not over-represented;

receiving input to the bias detection engine, the input including a test data set, features related to the test data set, and parameters of the features;

processing the input by the bias detection engine by clustering data points in the test data set into clusters;

outputting, by the bias detection engine, a diversity score for the test data set based on the clusters, wherein the diversity score represents an amount of representation bias in the test data set; and wherein the output includes a distribution per feature and/or parameter and a comparison of the distribution to corresponding distributions of the training data set and wherein the bias detection engine is configured to prevent over-sampling.

2. The method of claim 1, wherein the clusters are scored using a Shannon score, further comprising determining a threshold score.

3. The method of claim 2, wherein the test data set is biased when the diversity score is below the threshold score and wherein the test data set is sufficiently unbiased when the diversity score is greater than the threshold score.

4. The method of claim 1, further comprising generating additional scores including at least one of:
   a distribution per feature/parameter;
   a comparison of distribution between the test data set and a base data set;
   a comparison of the test data set to an average data set;
   a comparison of the test data set to other data sets having the same features; or
   an improvement in the diversity score for the test data set over time.

5. The method of claim 1, further comprising generating an explanation of the diversity score.

6. The method of claim 4, further comprising generating a visualization of the diversity score and/or the additional scores.

7. The method of claim 1, further comprising generating an explanation of implications of the diversity score.

8. The method of claim 1, further comprising generating suggestions for improving the test data set.

9. The method of claim 1, wherein the test data set includes images of faces and wherein the bias detection engine is trained with a training data set of images of faces.

10. The method of claim 1, wherein the training data set covers all groups of a population represented by the training data set, wherein all groups are of equal sizes or wherein the training data are configured such than any one group of the population not over-represented.

11. A non-transitory storage medium having stored therein instructions that are executable by one or more hardware processors to perform operations comprising:
   training a bias detection engine with a training data set that is unbiased or substantially unbiased, wherein the training data set covers all groups of a population represented by the training data set, wherein all the groups are of equal sizes or wherein the training data set is configured such than any one group of the population is not over-represented;

receiving input to the bias detection engine, the input including a test data set, features related to the test data set, and parameters of the features;

processing the input by the bias detection engine by clustering data points in the test data set into clusters;

outputting, by the bias detection engine, a diversity score for the test data set based on the clusters, wherein the diversity score represents an amount of representation bias in the test data set; and wherein the output includes a distribution per feature and/or parameter and a comparison of the distribution to corresponding distributions of the training data set and wherein the bias detection engine is configured to prevent over-sampling.

12. The non-transitory storage medium of claim 11, wherein the clusters are scored using a Shannon score, further comprising determining a threshold score.

13. The non-transitory storage medium of claim 12, wherein the test data set is biased when the diversity score is below the threshold score and wherein the test data set is sufficiently unbiased when the diversity score is greater than the threshold score.

14. The non-transitory storage medium of claim 11, further comprising generating additional scores including at least one of:
   a distribution per feature/parameter;
   a comparison of distribution between the test data set and a base data set;
   a comparison of the test data set to an average data set;
   a comparison of the test data set to other data sets having the same features; or
   an improvement in the diversity score for the test data set over time.

15. The non-transitory storage medium of claim 14, further comprising generating a visualization of the diversity score and/or the additional scores.

16. The non-transitory storage medium of claim 11, further comprising generating an explanation of implications of the diversity score, generating suggestions for improving the test data set, and generating an explanation of the diversity score.

17. The non-transitory storage medium of claim 11, further wherein the test data set includes images of faces and wherein the bias detection engine is trained with a training data set of images of faces.

18. The non-transitory storage medium of claim 11, further wherein the training data set covers all groups of a population represented by the training data set, or wherein all groups are of equal sizes or wherein the training data are configured such that any one group in the population is not over-represented.

* * * * *

UNITED STATES PATENT AND TRADEMARK OFFICE
CERTIFICATE OF CORRECTION

| | | |
|---|---|---|
| PATENT NO. | : 12,400,305 B2 | Page 1 of 1 |
| APPLICATION NO. | : 17/451898 | |
| DATED | : August 26, 2025 | |
| INVENTOR(S) | : Farida Shafik et al. | |

It is certified that error appears in the above-identified patent and that said Letters Patent is hereby corrected as shown below:

In the Specification

Column 5
Line 51, change "This provide the user" to -- This provides the user --

In the Claims

Column 10
Claim 1, Lines 64-66, change "wherein all the groups are of equal sizes or wherein the training data set is configured" to -- wherein all groups are of equal sizes or wherein the training data are configured --

Column 11-12
Claim 11, starting on Line 55, change "wherein all the groups are of equal sizes or wherein the training data set is configured" to -- wherein all groups are of equal sizes or wherein the training data are configured --

Signed and Sealed this
Twenty-third Day of December, 2025

John A. Squires
*Director of the United States Patent and Trademark Office*